United States Patent [19]
Lesartre

[11] Patent Number: 5,809,275
[45] Date of Patent: Sep. 15, 1998

US005809275A

[54] STORE-TO-LOAD HAZARD RESOLUTION SYSTEM AND METHOD FOR A PROCESSOR THAT EXECUTES INSTRUCTIONS OUT OF ORDER

[75] Inventor: Gregg Lesartre, Fort Collins, Colo.

[73] Assignee: Hewlett-Packard Company, Palo Alto, Calif.

[21] Appl. No.: 609,581

[22] Filed: Mar. 1, 1996

[51] Int. Cl.$^6$ .................................................. G06F 9/00
[52] U.S. Cl. ............................................ 395/392; 395/591
[58] Field of Search ........................... 395/390, 392, 395/393, 394, 395, 591, 800.23, 566

[56] References Cited

U.S. PATENT DOCUMENTS

| | | | |
|---|---|---|---|
| 5,345,569 | 9/1994 | Tran ........................................ | 395/393 |
| 5,404,470 | 4/1995 | Miyake .................................... | 395/393 |
| 5,467,473 | 11/1995 | Kahle et al. ............................. | 395/392 |
| 5,542,075 | 7/1996 | Ebcioglu et al. ........................ | 395/566 |
| 5,546,597 | 8/1996 | Martell et al. ........................... | 395/393 |
| 5,546,599 | 8/1996 | Song ........................................ | 395/591 |
| 5,557,763 | 9/1996 | Senter et al. ............................ | 395/800 |
| 5,584,038 | 12/1996 | Papworth et al. ................. | 395/800.23 |
| 5,621,910 | 4/1997 | Nagamatsu ............................. | 395/392 |
| 5,625,789 | 4/1997 | Hesson et al. .......................... | 395/393 |
| 5,625,835 | 4/1997 | Ebcioglu et al. ........................ | 395/591 |
| 5,627,985 | 5/1997 | Fetterman et al. . | |
| 5,630,157 | 5/1997 | Dwyer, III .............................. | 395/390 |
| 5,651,124 | 7/1997 | Shen et al. ......................... | 395/800.23 |
| 5,699,538 | 12/1997 | Le et al. ............................. | 395/800.23 |
| 5,708,843 | 1/1998 | Abramson et al. ..................... | 395/566 |

OTHER PUBLICATIONS

Smith et al., Implementing Precise Interrupts in Pipelined Processors, IEEE 1988, pp. 562–573.

Wang et al., Implementing Precise Interruptions in Pipelined RISC Process, Aug. 1993, pp. 36–43.

Lenell, A 20MHz CMOS Reorder Buffer for a Superscalar Microprocessor, NASA 1992, pp. 2.3.1–2.3.12.

Sohi, Instruction Issue Logic For High Performance, Interruptible, Multiple Functional Unit, . . . , Mar. 1990, pp. 349–359.

*Primary Examiner*—Parshotam S. Lall
*Assistant Examiner*—Patrice L. Winder

[57] ABSTRACT

A store-to-load (ST/LD) hazard resolution system for resolving conflicts produced from ST/LD instruction dependencies and out of order execution of instructions in a processor. The ST/LD hazard resolution system involves the following components. A fetch mechanism (IFETCH) fetches instructions from an instruction cache (ICACHE). A memory instruction queue (MQUEUE) receives instructions that are directed to a data cache (DCACHE) or a main memory from the IFETCH and executes the instructions out of order. The MQUEUE includes instruction registers and corresponding address reorder buffer slots (ARBSLOTs) for receiving memory instructions and data addresses corresponding to the results of instruction execution, respectively. A ST/LD hazard resolution system is associated with each ARBSLOT for recognizing and tracking ST/LD dependencies among the memory instructions. When a load instruction depends upon a store instruction and the load instruction is unexecuted, then the load instruction is put on hold until the store instruction is executed and cleared. When the dependent load instruction is already executed, then the ST/LD hazard resolution system associates a panic trap indicator with the executed load instruction. After an instruction is executed in the MQUEUE, it is retired by a retire mechanism. During the retirement process, upon recognizing a panic trap indicator, a trap vector generator associated with the retire mechanism purges instructions from the MQUEUE and causes the IFETCH to recommence fetching, beginning with the panic trapped instruction.

27 Claims, 9 Drawing Sheets

STORE-TO-LOAD HAZARD RESOLUTION SYSTEM AND METHOD FOR A PROCESSOR THAT EXECUTES INSTRUCTIONS OUT OF ORDER

FIELD OF THE INVENTION

The present invention generally relates to computer processor architectures, and more particularly, to a store-to-load (ST/LD) hazard resolution system and method for resolving conflicts involving ST/LD instruction dependencies in a processor that executes instructions out of order.

BACKGROUND OF THE INVENTION

A computer processor (processing unit) generally comprises a control unit, which directs the operation of the system, and an arithmetic logic unit (ALU), which performs computational operations. The design of a processor involves the selection of a register set(s), communication passages between these registers, and a means of directing and controlling how these operate. Normally, a processor is directed by a program, which consists of a series of instructions that are kept in a main memory. Each instruction is a group of bits, usually one or more words in length, specifying an operation to be carried out by the processor. In general, the basic cycle of a processor comprises the following steps: (a) fetch an instruction from main memory into an instruction register; (b) decode the instruction (i.e., determine what it indicates should be done; each instruction indicates an operation to be performed and the data to which the operation should be applied); (c) carry out the operation specified by the instruction; and (d) determine where the next instruction is located. Normally, the next instruction is the one immediately following the current one.

However, in high performance processors, such as superscalar processors where two or more scaler operations are performed in parallel, the processor may be designed to perform instructions that are out of order, or in an order that is not consistent with that defined by the software driving the processor. In these systems, instructions are executed when they can be executed, as opposed to when they appear in the sequence defined by the program. Moreover, after execution of out of order instructions, the results are ultimately reordered to correspond with the instruction order, prior to passing the results back to the program.

A cache memory is often employed in association with a processor in a computer in order to optimize performance. A cache memory is a fast buffer located between the processor and the main memory of the computer. Data and instructions in current use in the processor are moved into the cache memory, thereby producing two benefits. First, the average access time for the processor's memory requests are reduced, increasing the processor's throughput. Second, the processor's utilization of the available memory bandwidth is thereby reduced, allowing other devices on the system bus to use the memory without interfering with the processor. A cache memory is thus used to speed up the flow of instructions and data into the processor from the main memory. This cache function is important because the main memory cycle time is typically slower than processor clocking rates.

When a processor accesses a data cache for a data line, the processor forwards an address to the cache. The cache parses a cache index from the address and uses it to select a storage location(s) that may contain the desired data line. The cache outputs a tag, which is a real page number (RPN) in some designs, corresponding with the location(s) and a status indicator, which indicates whether the data line corresponding with the tag is valid or invalid.

Support circuitry, typically associated with the cache, receives the status indicator and the tag. When the status indicator indicates invalid data, then the support circuitry forwards a "miss" indication to the processor, in which case the processor must access the main memory for the data line. When the status indicator indicates valid data, the support circuitry compares the tag with the remainder of the address in order to determine if the cache is currently storing the desired data line. When the cache does not have the data line being requested as determined by the tag comparison, then the support circuitry forwards a "miss" indication to the processor, in which case the processor must access the main memory for the data line. When the cache does have the data line being requested as determined by the tag comparison, then the support circuitry forwards a "hit" indication to the processor, which prompts the processor to read the requested data line.

Generally, a "load" instruction is a request to transfer data from storage (cache or main memory) to a register, whereas a "store" instruction is a request to transfer data from a register to storage. As an example, consider a scenario where a store instruction is followed by a load instruction that depends on the store instruction, i.e., a store-to-load (ST/LD) dependency exists. The load instruction should wait for the store instruction's results before the load instruction executes. In a computer that executes instructions in order, there is no problem because the store instruction will be executed prior to the load instruction, and therefore, the store instruction's results will be available to the load instruction when it executes.

However, in a processor that executes instructions out of order, incorrect results can be obtained due to these ST/LD dependencies. Specifically, if a load instruction is dependent upon a store instruction, and the load instruction is executed before the store instruction, then the load instruction transfers invalid data. The store instruction should be executed before the load instruction in order to achieve proper results. Hence, in a processor that executes instructions out of order, there needs to be a mechanism for recognizing and tracking ST/LD dependencies and recovering from inaccurate results, if they arise from such dependencies.

SUMMARY OF THE INVENTION

An object of the present invention is to overcome the inadequacies and deficiencies of the prior art as discussed above in the background section.

Another object of the present invention is to improve the performance of processors that execute instructions out of order.

Another object of the present invention is to track and store-to-load (ST/LD) dependencies in a processor that executes instructions out of order.

Another object of the present invention is to resolve conflicts involving ST/LD dependencies in a processor that executes instructions out of order.

Another object of the present invention is to recover from inaccurate results produced from ST/LD dependencies and out of order execution of instructions in a processor.

Another object of the present invention is to provide a ST/LD hazard resolution system that is simple in design, reliable in operation, and capable of inexpensive mass production for realizing inexpensive processors and computers.

Briefly described, the present invention provides a hazard resolution system and method that can be utilized for resolving conflicts produced from ST/LD instruction dependencies and out of order execution of instructions in a processor. The ST/LD hazard resolution system is implemented as follows.

A fetch mechanism (IFETCH) fetches instructions that are directed to a data cache (DCACHE) or a main memory from an instruction cache (ICACHE). A reordering mechanism receives the instruction from the IFETCH and executes the instructions out of order. In the preferred embodiment, a memory instruction queue (MQUEUE) is utilized as the reordering mechanism.

The MQUEUE includes instruction registers and corresponding address reorder buffer slots (ARBSLOTs) for receiving memory instructions and data addresses corresponding to the results of instruction execution, respectively. A ST/LD hazard resolution system is associated with each ARBSLOT for recognizing and tracking ST/LD dependencies among the memory instructions. When a load instruction depends upon a store instruction and the load instruction is unexecuted, then the load instruction is put on hold until the store instruction is executed and cleared. When the dependent load instruction is already executed, then the ST/LD hazard resolution system recognizes the architecturally incorrect execution and associates a panic trap indicator with the executed load instruction. The panic trap indicator is a nonarchitectural signal that is invisible to the software driving the processor.

More specifically, the ST/LD hazard resolution system determines when an executed load instruction depends on a nonexecuted store instruction. In this event, the ST/LD hazard resolution system associates the panic trap indicator with the executed load instruction.

After each instruction is fully executed in the MQUEUE, it is retired by a retire mechanism. During the retirement process, upon recognizing the panic trap indicator, a trap vector generator associated with the retire mechanism purges any remaining instructions from the MQUEUE and causes the IFETCH to recommence fetching, beginning with the panic trapped instruction. Hence, recovery from the ST/LD dependency is accomplished.

The present invention can also be viewed as providing a novel method for resolving conflicts produced from store-to-load dependencies and out of order execution of instructions in a processor. The method can be broadly summarized by the following steps: accumulating a set of instructions; executing the instructions out of order; retiring instructions after execution by removing the retired instructions from the set; determining that a load instruction was executed prior to a store instruction and that the load instruction was dependent upon data that was to be provided by the store instruction; associating a panic trap indicator with the load instruction based upon the determination; and when retiring the load instruction, recognizing the panic trap indicator, purging any remaining instructions in the set, reaccumulating another set of instructions, beginning with the load instruction, and executing the another set of instructions out of order.

Other objects, features, and advantages of the present invention will become apparent to one of skill in the art upon examination of the following drawings and detailed description. It is intended that all such additional objects, features, and advantages be included herein within the scope of the present invention, as defined by the claims.

BRIEF DESCRIPTION OF THE DRAWINGS

The invention can be better understood with reference to the following drawings. In the drawings, the schematic illustrations of the various components therein are not necessarily to scale relative to each other, emphasis instead being placed upon clearly illustrating principles of the invention. Furthermore, like reference numerals designate corresponding parts throughout the several views.

DETAILED DESCRIPTION OF THE PREFERRED EMBODIMENT

Figure 1:
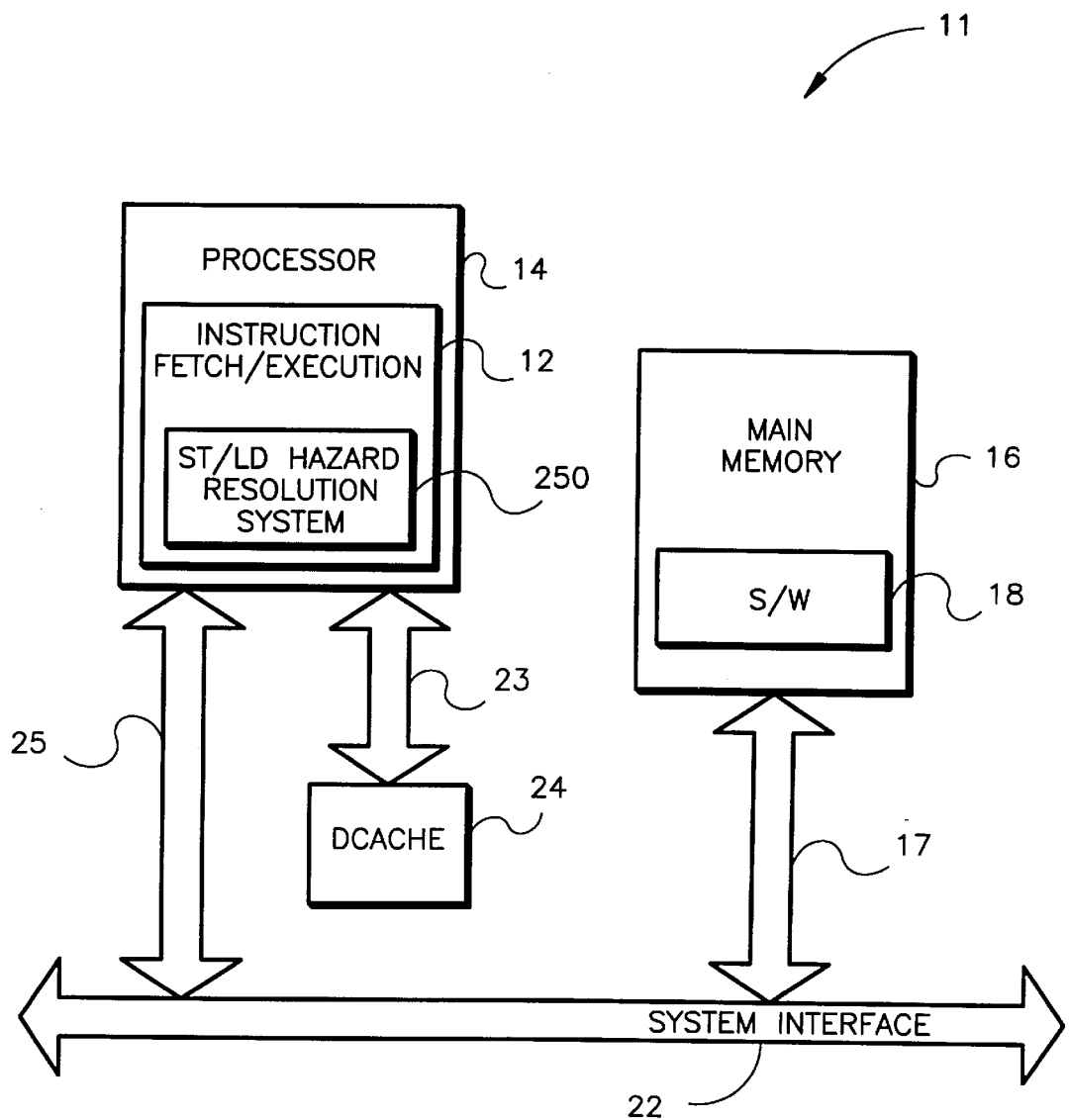
FIG. 1 is a block diagram showing a computer implementing the novel store-to-load (ST/LD) hazard resolution system and method of the present invention.

As shown in FIG. 1, the store-to-load (ST/LD) hazard resolution system 250 (see FIGS. 3–5 for more details) and associated methodology of the present invention is implemented within a computer 11, and particularly, within an instruction fetch/execution system 12 within a processor 14 of the computer 11. The computer 11 generally comprises the processor 14, a main memory 16 having software (S/W) 18 for driving the processor 14, a data cache 24 (DCACHE) interconnected with the processor 14 as indicated by reference arrow 23, and a system interface 22, such as one or more buses, interconnecting the processor 14 and the main memory 16. In operation, as the instruction fetch/execution system 12 in the processor 14 executes the software 18, data that is in current use in the processor 14 is moved into the DCACHE 24, thereby reducing the average access time for the processor's memory requests and minimizing traffic on the system interface 22. Finally, it should be mentioned that, with the exception of the novel ST/LD hazard resolution system 250, all of the aforementioned computer components and their interactions are well known and understood in the art.

A typical cache line in the DCACHE 24 includes a tag, a status indicator, and data. A cache index is forwarded to the DCACHE 24 and is used by the DCACHE 24 to select a storage location(s) that may contain the desired data line. In response to receipt of a cache index, the DCACHE 24 outputs a tag, which is a real page number (RPN) in the preferred embodiment, corresponding with the location(s), a status indicator, which indicates whether the data line corresponding with the tag is valid or invalid, and data, which may be valid or invalid. Typically, the status indicator indicates the following states: "invalid," which means that no data is present; "valid shared," which means that data is present, but may be also located elsewhere; "valid private clean," which means that the line has the sole copy and the DCACHE 24 has not yet written to the line; and "valid private dirty," which means that the line has the sole copy and that the DCACHE 24 has written to the line (and thus needs to copy the line to main memory 16.

A tag compare mechanism 229 (FIG. 6) associated with the DCACHE 24, receives the status indicator and the tag. When the status indicator indicates invalid data, then the tag compare mechanism 229 forwards a "miss" indication to the processor 14, in which case the processor 14 accesses the main memory 16 for the data line. When the status indicator indicates valid data, the tag compare mechanism 229 compares the tag with the remainder of the address in order to determine if the DCACHE 24 is currently storing the desired data line. When the DCACHE 24 does not have the data line being requested as determined by the tag comparison, then the tag compare mechanism 229 forwards a "miss" indication to the processor 14, in which case the processor 14 accesses the main memory 16 for the data line. When the DCACHE 24 does have the data line being requested as determined by the tag comparison, then the tag compare mechanism 229 forwards a "hit" indication to the processor 14, which prompts the processor 14 to read the requested data line.

Figure 2:
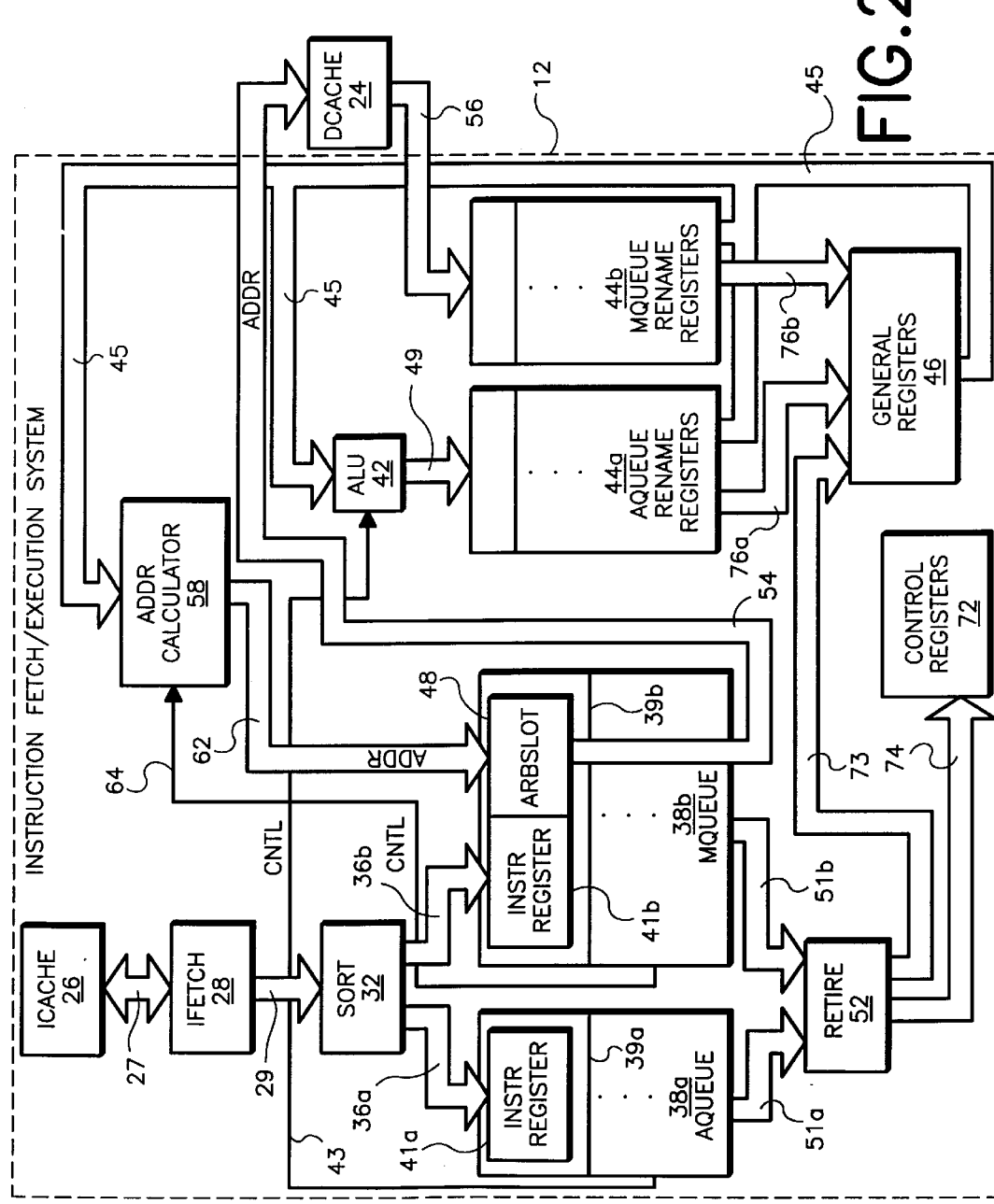
FIG. 2 is a block diagram showing a possible implementation of an instruction fetch/execution system in a processor of FIG. 1.

A possible implementation of the instruction fetch/execution system 12 is illustrated by way of block diagram in FIG. 2. As shown in FIG. 2, the instruction fetch/execution system 12 has an instruction cache (ICACHE) 26 for storing instructions from the software 18 (FIG. 1). An instruction fetch mechanism (IFETCH) 28 communicates with the instruction cache 26 and retrieves instructions from the cache 26 for ultimate execution. In the preferred embodiment, the instruction IFETCH 28 fetches four instructions (each 32 bits) at a time and transfers the instructions to a sort mechanism 32.

From the IFETCH 28, the instructions are sent to a suitable reordering mechanism, such as a queue(s) or reservation station. In the preferred embodiment, the instructions sorted and distributed to an arithmetic logic unit (ALU) and a memory queue (MQUEUE).

More specifically, a sort mechanism 32 receives the instructions from the IFETCH 28 and determines whether each instruction is destined for an arithmetic logic unit (ALU) or the memory. The sort mechanism 32 distributes the instructions accordingly into an AQUEUE 38a and an MQUEUE 38b, respectively, as indicated by corresponding reference arrows 36a, 36b.

The AQUEUE 38a contains ALU instruction processing mechanisms 39a (in the preferred embodiment, there are 28 in number) that have registers 41a for storing respective instructions that are directed to an arithmetic logic unit 42, as indicated by reference arrow 43. The instructions in the AQUEUE 38a are executed in any order possible (preferably, in data flow fashion). As an instruction completes, the results are captured by the AQUEUE rename registers 44a, and the instruction is marked as complete in the AQUEUE 38a. In the preferred embodiment, the AQUEUE 38a receives up to four instructions (32 bits each) per cycle from the sort mechanism 32 and transfers up to two instructions (32 bits) per cycle to a retire mechanism (RETIRE) 52, as indicated by reference arrow 51a.

The ALU 42, under the control of the AQUEUE 38a, can retrieve operands from rename registers 44a, 44b and general registers 46, as is indicated by interface 45. After the ALU 42 operates on the operands, the results of the operation are stored in the AQUEUE rename registers 44a, as delineated by reference arrow 49.

The MQUEUE 38b contains instruction processing mechanisms 39b. Each instruction processing mechanism 39b includes a register 41b for storing a respective memory instruction and includes an address reorder buffer slot (ARBSLOT; in the preferred embodiment, there are 28 in number), denoted by reference numeral 48, for storing a respective address. Memory instructions in the MQUEUE 38b can be classified as "loads" and "stores" to memory. A "load" is a request to transfer data from memory (cache or main memory) to a register, whereas a "store" is a request to transfer data from a register to memory.

During execution of an instruction, a first phase involves executing a prescribed mathematical operation on operandi in order to compute an address, and a second phase involves accessing the memory/cache for data based upon the calculated address. The MQUEUE 38b executes each of the instructions, the two phases of execution, and the memory/cache accesses in any order possible (preferably, in data flow fashion). As the instructions complete, the results are captured by the MQUEUE rename registers 44b and the instruction is marked as complete in the MQUEUE 38b. In the preferred embodiment, the MQUEUE 38b receives up to four instructions (32 bits each) per cycle from the sort mechanism 32 and transfers up to two instructions (32 bits) per cycle to the retire mechanism 52, as indicated by reference arrow 51b.

More specifically, during the first phase of instruction execution, an address is generated by an address calculator 58. The address calculator 58 computes the address based upon operandi retrieved from the MQUEUE rename registers 44b and passes the address (real or virtual) to an ARBSLOT 48 corresponding to the instruction in the MQUEUE 38b, as indicated by reference arrow 62. Control of the calculation by the instruction is indicated by the reference arrow 64 in FIG. 2. When the second phase of memory instruction execution is pursued, the calculated address (including a cache index) is transferred to the DCACHE 24, as indicated by the reference arrow 54, to accomplish a load or a store at the DCACHE 24. In the preferred embodiment, two addresses are transferred each cycle, if possible, from the MQUEUE 38b to the DCACHE 24. To accommodate this multiple address feature, the DCACHE 24 may be implemented with dual ports, as an example. Alternatively, as another example and as implemented in the preferred embodiment, odd and even addresses are sent concurrently to respective odd and even cache banks in a single-ported random access memory (RAM). The details of the latter design are set forth in a copending application entitled, "Address Aggregation System And Method For Increasing Throughput Of Addresses To A Data Cache From A Processor," filed the same day as the instant application by the same inventor hereof. The foregoing disclosure is incorporated herein by reference as if set forth in full hereinbelow. Once the DCACHE 24 processes the address, the data results are transferred to the MQUEUE rename registers 44b, as indicated by reference arrow 56.

The retire mechanism 52 receives executed instructions (preferably, two 32-bit words per cycle) from each of the queues 38a, 38b. The retire mechanism 52 commits the instruction results to the architecture state. The software 18

(FIG. 1) is not made aware of any results that are not transformed to the architecture state by the retire mechanism 52. The retire mechanism 52 retires the instructions in the queues 38a, 38b in the program order defined by the software 18 by moving the instruction results to a general register 46 and/or a control register 72, as indicated by respective reference arrows 73, 74, depending upon the instruction's attributes, and causes the results of the instruction to be passed from the rename registers 44a, 44b to the general registers 46, as indicated by the reference arrows 76a, 76b.

When the retire mechanism 52 retires an instruction that resulted in a store to a data line in the cache 24, the retire mechanism 52 marks the status indicator corresponding with the line as "dirty" to indicate that the line has changed and should ultimately be forwarded to the main memory 16 for updating the line at the main memory 16.

The retire mechanism 52 also has logic for determining whether there is an exception associated with an instruction. An exception is a flag that indicates a special circumstance corresponding with one or more previous instructions. In the event of an exception, the retire mechanism 52 discards all instructions within the queues 38a, 38b that precede the instruction that indicated the exception and causes the instruction fetch mechanism 28 to retrieve once again the instructions at issue for re-execution or to retrieved special software to handle the special circumstance.

Panic Trap System

The panic trap system 101 and associated methodology will now be described with reference to FIGS. 3 through 5. Generally, the panic trap system 101 and associated methodology permit recovery from inaccurate out of order execution of instructions by recognizing the error and commencing reexecution of the instruction that resulted in the error, thereby reaching the correct result during the second execution attempt. This objective is accomplished by utilizing the concept of a panic trap that is a nonarchitectural hardware signal, which is not visible to the software 18 (FIG. 1).

The panic trap can be generated by: (a) the IFETCH 28 in the event of a timing or synchronization requirement regarding an instruction; (b) an ARBSLOT 48 in a memory instruction processing mechanism 39b in the MQUEUE 38b in the event of inaccurate out of order execution of a memory instruction; (c) the DCACHE 24 in the event of a detected parity error regarding an access pursuant to a memory instruction; and/or (d) a system interface control 22, which controls accesses to/from the system interface 22, in the event of a synchronization instruction (e.g., in a multiprocessor (MP) system), an external interrupt, etc.

More specifically, the IFETCH 28 may want to initiate a panic trap for timing or synchronization purposes. As an example, the IFETCH 28 can insert wait cycles by setting a panic trap in connection with an instruction. In the preferred embodiment, a panic trap indicator 102 (one or more bits) is associated with each instruction 104 that is passed to an instruction processing mechanism 39a, 39b. The IFETCH 28 may assert the panic trap indicator 102 associated with an instruction 104 that gives rise to potentially incorrect behavior. The panic trap indicator 102, based upon its assertion or deassertion, indicates whether or not the particular instruction 104 should initiate a panic trap when it is ultimately retired by the retire mechanism 52. It should be noted that instead of implementing one or more bits as the panic trap indicator 102, a panic trap load instruction can be placed in the AQUEUE 38a by the IFETCH 28 for initiating the panic trap at the retire mechanism 52.

With respect to generation of the panic trap by an ARBSLOT 48 itself, the panic trap indicator 102 associated with a memory instruction 104 may be asserted by the corresponding ARBSLOT 48 when execution of the instruction gives rise to inaccurate results. The panic trap indicator 102, based upon its assertion or deassertion, indicates whether or not the particular instruction 104 should initiate a panic trap when it is ultimately retired by the retire mechanism 52. An example of when the panic indicator 102 is asserted by an ARBSLOT 48 in connection with an instruction 104 is the situation where the instruction 104 was a load instruction that was dependent upon a store instruction wherein the store instruction had not executed prior to the load instruction. In this event, the load instruction results in the generation of invalid data that should be disregarded.

The DCACHE 24 can also provide a panic trap indicator 102 to the retire mechanism 52, as is indicated by reference arrow 106. In this regard, the DCACHE 24 has parity check logic for ensuring that stores to and loads from the DCACHE 24 are proper. Specifically, during a load, the DCACHE 24 checks the tags and data for parity errors, and during a store, the DCACHE 24 checks the tags for parity errors. If a parity error is detected, the DCACHE 24 asserts the panic trap indicator to the retire mechanism 52. In some cases, there can be recovery from the parity error and in other cases (e.g., dirty data, tag errors, etc.), there cannot be recovery. In the case when there can be recovery, the retire mechanism 52 causes reexecution of the instruction that discovered the parity error and causes a new data line to be retrieved from the main memory 16. In the case when recovery is not possible, the retire mechanism 52 vectors to trap code that ultimately stops operation of the computer 11.

A system interface control 108 associated with the processor 14 can also provide a panic trap indicator to the retire mechanism 52, as is indicated by reference arrow 112. The system interface control 108 controls accesses to and from the system interface 22. As an example, in a multiprocessor (MP) system, the system interface control 108 can receive synchronization instructions from the system interface 22 in order to ensure that the processor 14 is in synchronization with other processors of the MP system. When a synchronization instruction is received by the system interface control 108, the system interface control 108 asserts the panic trap indicator to the retire mechanism 52. The instruction that happens to get this panic trap will be refetched, after the queues 38a, 38b have been flushed, and program execution continues in synchronization as a result of the flush and restart operation.

When the retire mechanism 52 retires instructions 104 that have an asserted panic trap indicator 102 or when the retire mechanism 52 receives an asserted panic trap indicator 106, 112 from the DCACHE 24 or the system interface control 108, then the retire mechanism 52 communicates a trap indication to a trap vector generator 114, as indicated by the reference arrow 116. The retire mechanism 52 indicates to the trap vector generator 114 that a panic trap has been asserted and forwards the instruction address corresponding with the panic trap. In turn, the trap vector generator 114 purges the contents of the AQUEUE 38a and the MQUEUE 38b, as is indicated by reference arrows 118, 118a, 118b. Moreover, the trap vector generator 114 sends the instruction address to the IFETCH 28, as indicated by reference arrow 121. The IFETCH 28 commences retrieving instruction addresses from the ICACHE 26, as denoted by reference arrow 27, beginning with the new instruction address, and places the addresses in the AQUEUE 38a and the MQUEUE 38b for out of order execution. Accordingly, execution of instructions begins once again, starting with the instruction address of the panic trapped instruction.

The retire mechanism 52 may also receive architectural traps (not nonarchitectural panic traps). As an example, the system interface control 108 may receive an external interrupt from the system interface 22. In this event, the system interface control 108 asserts a trap signal to the retire mechanism 52 along with the instruction address corresponding with the code to handle the external interrupt. Moreover, the retire mechanism 52 indicates to the trap vector generator 114 that a trap has been asserted and forwards the instruction address corresponding with the trap. The trap vector generator 114 in turn responds, as discussed previously.

Figure 4:
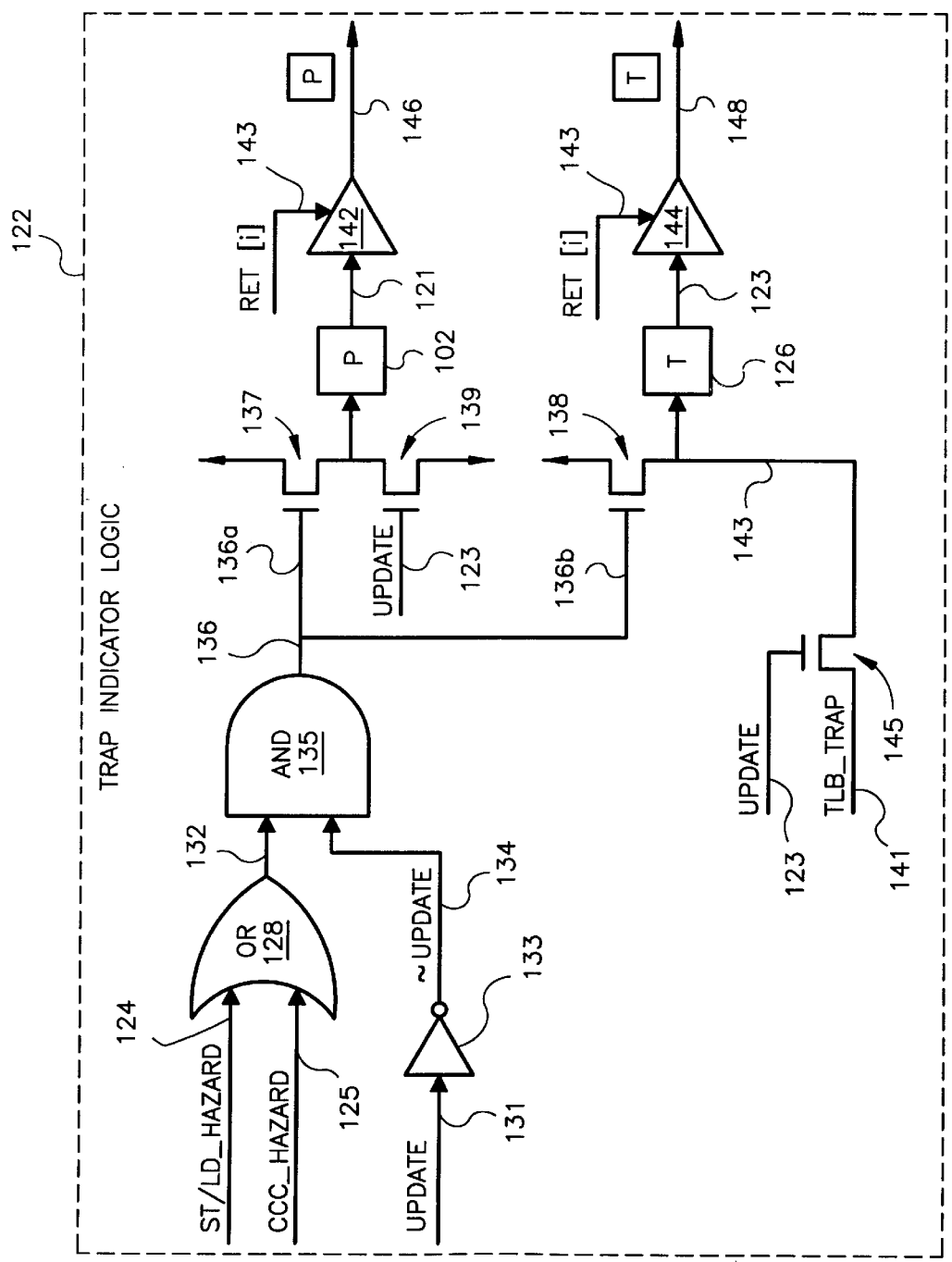
FIG. 4 is a block diagram showing a possible implementation of panic indicator logic that asserts a panic indicator in each address reorder buffer slot (ARBSLOT) of FIG. 3.

A possible implementation of trap indicator logic within each ARBSLOT 48 for generating nonarchitectural panic traps as well as conventional architectural traps is illustrated in detail in FIG. 4 and generally denoted by reference numeral 122. Referring to FIG. 4, the trap indicator logic 122 receives inputs that are capable of causing assertion of a panic trap signal 121 from a panic trap indicator (P) 102 as well as an architectural trap signal 123 from an architectural trap indicator (T) 126. In the preferred embodiment, the trap indicators 102, 126 are latches or other suitable logic storage devices.

In this regard, the trap indicator logic 122 receives, for example but not limited to, a store-to-load (ST/LD) hazard signal (ST/LD_HAZARD; see FIG. 7) 124 and a cache coherency check (CCC) hazard signal (CCC_HAZARD; see FIG. 6) 125. The hazard signals 124, 125 are communicated to an OR logic gate 128, which generates a signal 132 that is passed to an AND logic gate 135 to indicate when a panic trap should be asserted. The AND logic gate 135 also receives a signal ~UPDATE 134 from an inverter 133 that receives the signal UPDATE 131. The signal UPDATE 134 is asserted when the instruction corresponding with the trap indicator logic 122 asserts its data address into the corresponding ARBSLOT 48. Assertion of the signal UPDATE 134 deasserts, or clears, the P signal 121. Assertion of the signal UPDATE 134 will clear the trap signal T 123 if the signal TLB_TRAP 141 is deasserted, and set the trap signal 123 if the signal TLB_TRAP 141 is asserted through transistor 145. Further, the signal ~UPDATE 134, which is fed to the AND logic gate 135, is asserted after the clearing process, so that the hazard signals 124, 125, if any, are captured sometime during the life of an instruction and cause assertion of signal 136 from the AND logic gate 135.

The signal 136 from the AND logic gate 135 actuates transistors 137, 138. Transistor 137 can ultimately generate a panic trap and transistor 138 can ultimately generate an architectural trap. Relative to panic traps, the transistor 137 can cause assertion of the panic trap signal 121, when the signal UPDATE 123 is not asserted. Relative to architectural traps, the transistor 138 can cause assertion of the architectural trap signal 123, when both the signal UPDATE 123 is not asserted and a signal TLB_TRAP 141 from a translation lookaside buffer (TLB) 214 (FIG. 6) is asserted. In the preferred embodiment, assertion of a nonarchitectural panic trap signal 121 will also cause assertion of an architectural trap signal 123, but not vice versa.

When the instruction associated with the ARBSLOT 48 is retired by the retire mechanism 52 (FIG. 3), drivers 142, 144, as controlled by the retire signal RET[i] 143 where i corresponds to the particular ARBSLOT 48 containing the trap indicator logic 122, drive the panic trap signal 121 and the architectural trap signal 123, respectively, to the retire mechanism 52, as indicated by reference arrows 146, 148.

In the preferred embodiment, 28 retire pointers RET[27:0] are generated for each of the AQUEUE 38a and the MQUEUE 38b. These retire pointers RET[27:0] indicate where the next two instructions are to be retired in each queue 38a, 38b. At any given time in each queue 38a, 38b, two of the foregoing retire pointers are asserted to two respective consecutive instruction processing mechanisms 39a, 39b, thereby indicating the two instruction processing mechanisms 39a, 39b containing the oldest instructions that have not yet been retired. When an instruction is retired, its corresponding pointer is deasserted and the next oldest is asserted. As an example of an implementation, the retire pointers RET[27:0] can be generated from a circular shift chain with twenty-eight master/slave latches.

Figure 5:
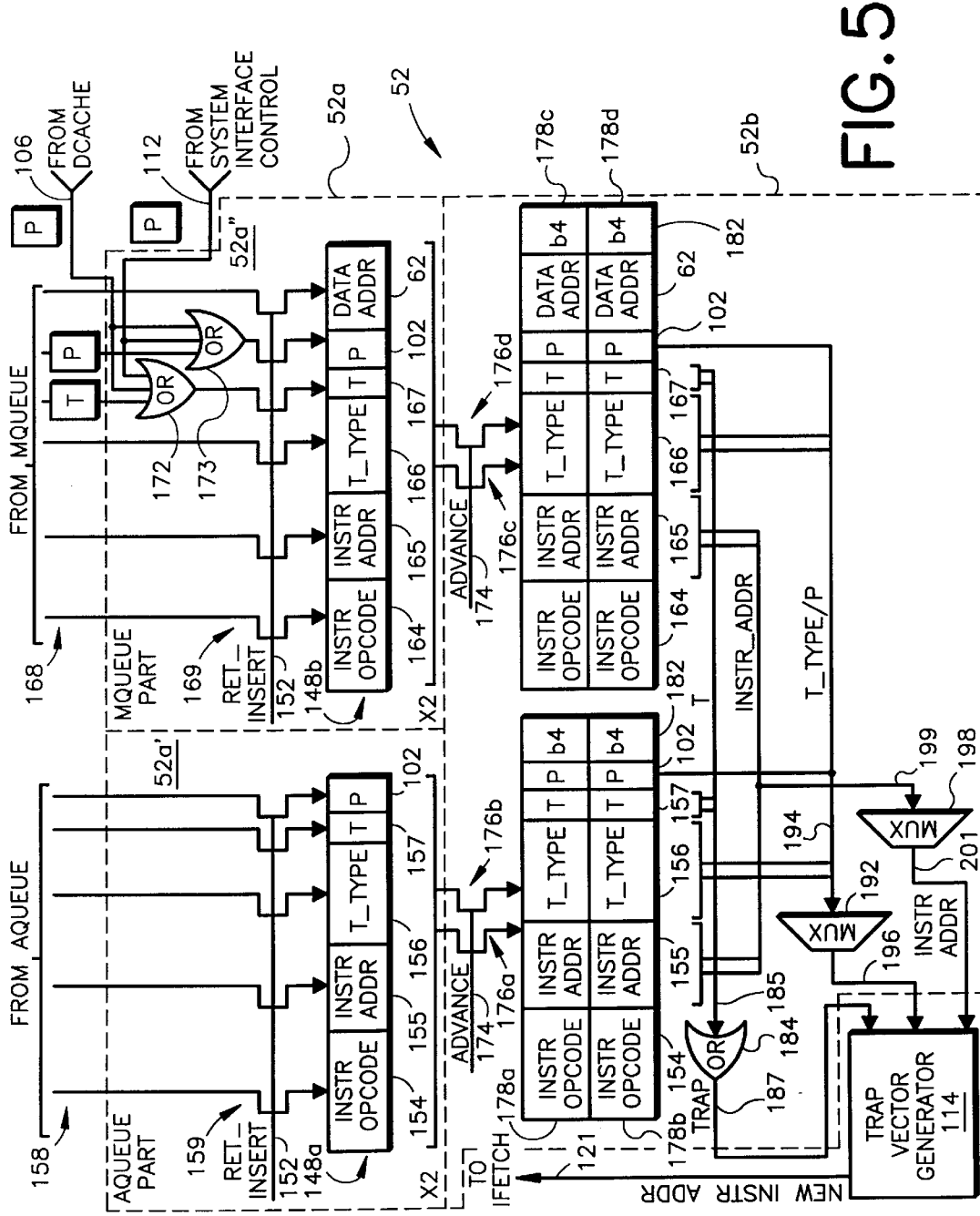
FIG. 5 is a block diagram showing a possible implementation of a retire mechanism (RETIRE) of FIG. 3.

A possible implementation of logic that is associated with the retire mechanism 52 in order to practice the present invention is shown in detail in FIG. 5. Recall that the retire mechanism 52 is configured to retire instructions and associated data in the AQUEUE 38a and the MQUEUE 38b and commit the results to the architecture state. With reference to FIG. 5, the retire mechanism 52 includes a two stage pipe having a first stage 52a and a second stage 52b.

In the first stage 52a, instruction data from the AQUEUE 38a and the MQUEUE 38b is analyzed separately by respective AQUEUE and MQUEUE parts 52a', 52a'' for indications of architectural traps and nonarchitectural panic traps. The concept of architectural traps is well known in the art. Examples of architectural traps are those (e.g., TLB miss, access write violation, an alignment violation, reference violation, etc.) generated by the translation lookaside buffer (TLB) 214 (FIG. 6) in the address calculator 58 (FIG. 2). If any traps (architectural or panic) are asserted, then the associated instruction is stalled and the trap indication is forwarded to the trap vector generator 114. The first stage 52a further analyzes the instructions and associated data in order to reorder and recombine the instructions from the AQUEUE 38a and the MQUEUE 38b. The recombining process occurs as the first stage 52a transfers the information to the second stage 52b. Ultimately, the instructions results are forwarded, in order, to the general registers 46 (FIG. 2) and/or the control registers 72 (FIG. 2).

More specifically, as shown in FIG. 5, the first stage 52a includes four registers 148, only two of which are shown for simplicity, and the two are designated particularly by reference numerals 148a, 148b. The registers 148a receive instruction data from the AQUEUE 38a, whereas the registers 148b receive instruction data from the MQUEUE 38b.

The registers 148a receive ALU operation code (OPCODE) 154, an instruction address (INSTR ADDR) 155, a trap type indicator (T_TYPE; one or more bits) 156, an architectural trap indicator (T; one or more bits) 157, and the panic trap indicator (P; one or more bits) 102. The T_TYPE 156 indicates the type of architectural trap. The aforementioned information is placed in the registers 148 via respective inputs 158 that are connected to respective transistors 159, which are clocked by a signal RET_INSERT 152.

In the MQUEUE part of the first stage 52a, the registers 148b receive a memory operation code (INSTR OPCODE) 164, an instruction address (INSTR ADDR) 165, a trap type indicator (T_TYPE; one or more bits) 166, an architectural trap indicator (T; one or more bits) 167, the panic trap indicator (P) 102, and a data address (DATA ADDR) 62. The foregoing information is transferred to the registers 148b via respective inputs 168 and respective transistors 169, which are clocked by the signal RET_INSERT 152.

An OR logic gate 172 is disposed to receive the architectural trap input as well as the panic trap indicators 106, 112 from the DCACHE 24 and the system interface control 108. The result of this gate 172 indicates whether or not this retiring instruction needs to trap.

An OR logic gate 173 is disposed to receive the panic trap indicators from the MQUEUE 38b, from the DCACHE 24, and from the system interface control 108, as further shown in FIG. 5. The result of this gate 173 indicates whether or not a panic trap indicator 102 has been associated with this retiring instruction. The panic trap indicators 102 from the DCACHE 24 and the system interface control 108 can be associated with any instruction because they are generated by an external system. The preferred embodiment assigns the trap to the next MQUEUE instruction to retire. If there is a choice between an architectural trap, indicated by T_TYPE 166, and a panic trap, then the architectural trap is acted upon, because it achieves the intended benefit of the panic trap and, additionally, is meaningful to the software 18.

It should be mentioned that in an alternative embodiment, the INSTR ADDRs 155, 165, may be replaced with pointers to a lookup table that stores the actual instruction addresses. This embodiment would save on storage space within the first stage 52a of the retire mechanism 52.

In the second stage 52b, a signal ADVANCE 174 actuates respective transistors 176a–176d in order to transfer the contents of registers 148a, 148b to respective registers 178a–178d. As mentioned previously, the instructions as positioned in the registers 178a–178d are in program order. If there are any trapped instructions, only the first trapped instruction is permitted in the registers 178a–178d. Each of the instructions has associated therewith a set of b4 bits 182, which indicate the order of the instructions. The b4 bits 182 are utilized to order the instructions when they are output from the retire mechanism 52.

The architectural trap indicators T 157, 167 are forwarded to an OR logic gate 184, as indicated by reference arrow 185, in order to generate a trap signal 187, which is indicative of whether or not any trap (architectural or panic; recall from the discussion relative to FIG. 4 that an architectural trap is asserted when a panic trap is asserted) should be generated. The trap signal 187 is passed on to the trap vector generator 114.

The trap type indicators 156, 166 and the panic trap indicators 102 are combined and are communicated to a multiplexer (MUX) 192, as indicated by reference arrow 194, in order to produce a trap type signal 196. When a trapped instruction resides in one of the registers 178a–178d, then no other valid trapped instruction resides in any of the other registers 178a–178d. Further, when the register 178a–178d having the trapped instruction outputs the T_TYPE and P, then that register 178a–178d controls the MUX 192 to pass these bits to the trap generator 114, as indicated by reference arrow 196. The trap type indicators 156, 166 are relevant to the trap indicators T 157, 167 in that they identify the type of architectural trap.

The INSTR ADDRs 155, 165 are communicated to a MUX 198, as indicated by reference arrow 199, in order to generate an instruction address 201 for the trap vector generator 114. The MUX 198 is controlled just as the MUX 192, so that the INSTR ADDR 201 pertaining to the trapped instruction is forwarded to the trap vector generator 114.

Figure 3:
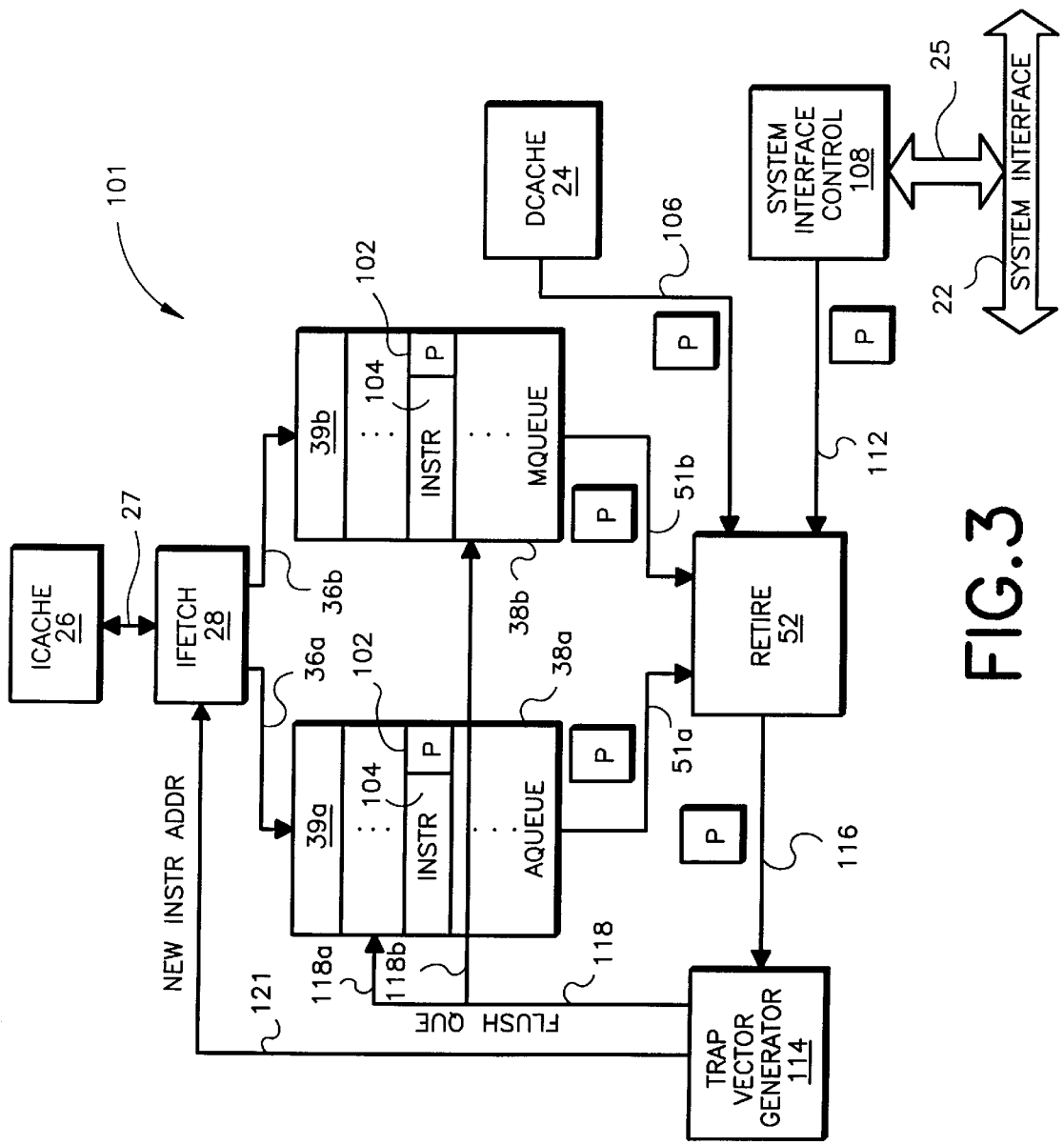
FIG. 3 is a block diagram showing a possible implementation of a panic trap system of FIG. 1.

Based upon receipt of an asserted trap signal 187, a trap type signal 196, a panic trap indicator 102, and an instruction address 201, the trap vector generator 114 generates the new instruction address 121 and passes it to the IFETCH 28 (FIG. 3). When the trap is an architectural trap T, then the new instruction address 121 corresponds to the address of a trap handler, for example but not limited to, a TLB miss handler, an external interrupt handler, etc. When the trap is a nonarchitectural panic trap P from the IFETCH 28 or an instruction processing mechanism 39a, 39b, then the new instruction address 121 corresponds to the panic trapped instruction.

Cache Coherency Check (CCC) Hazard Resolution System

Generation of the cache coherency check (CCC) hazard 125 (FIG. 4) will now be discussed with reference to FIG. 6. Each ARBSLOT 48 includes a CCC hazard resolution system 202 to determine whether a load instruction has already used CCC data, which should have been transferred out from the DCACHE 24 and not made available to the processor 14.

During a cache coherency check, another component, such as a remote processor or a remote input/output (I/O) device, that is connected to the system interface 22, wishes to have an exclusive copy of a data line. Accordingly, the remote component sends a request to the DCACHE 24 to determine if the DCACHE 24 has a copy of the data line. If the DCACHE 24 has the data line, then ownership of the data line is transferred from the DCACHE 24 to the remote component that is connected to the system interface 22.

In the MQUEUE 38b of the present invention, a particular ARBSLOT 48 is dedicated to receiving an address (including cache index and tag) corresponding with the CCC data line, and to access the DCACHE 24 to determine if the data line is present. The response to the CCC query is sent to the system interface control 108 (and ultimately to the system interface 22). The response includes the data line, if found, as well as its status indicator.

The address of the CCC data line is transferred to all ARBSLOTS 48 within the MQUEUE 38b in order to determine if any instructions in any of the ARBSLOTS 48 have used the CCC data line. If an instruction has already been executed that involves a load of the CCC data line, then a panic trap is associated with that instruction via its corresponding panic trap indicator 102 (FIG. 4).

Figure 6:
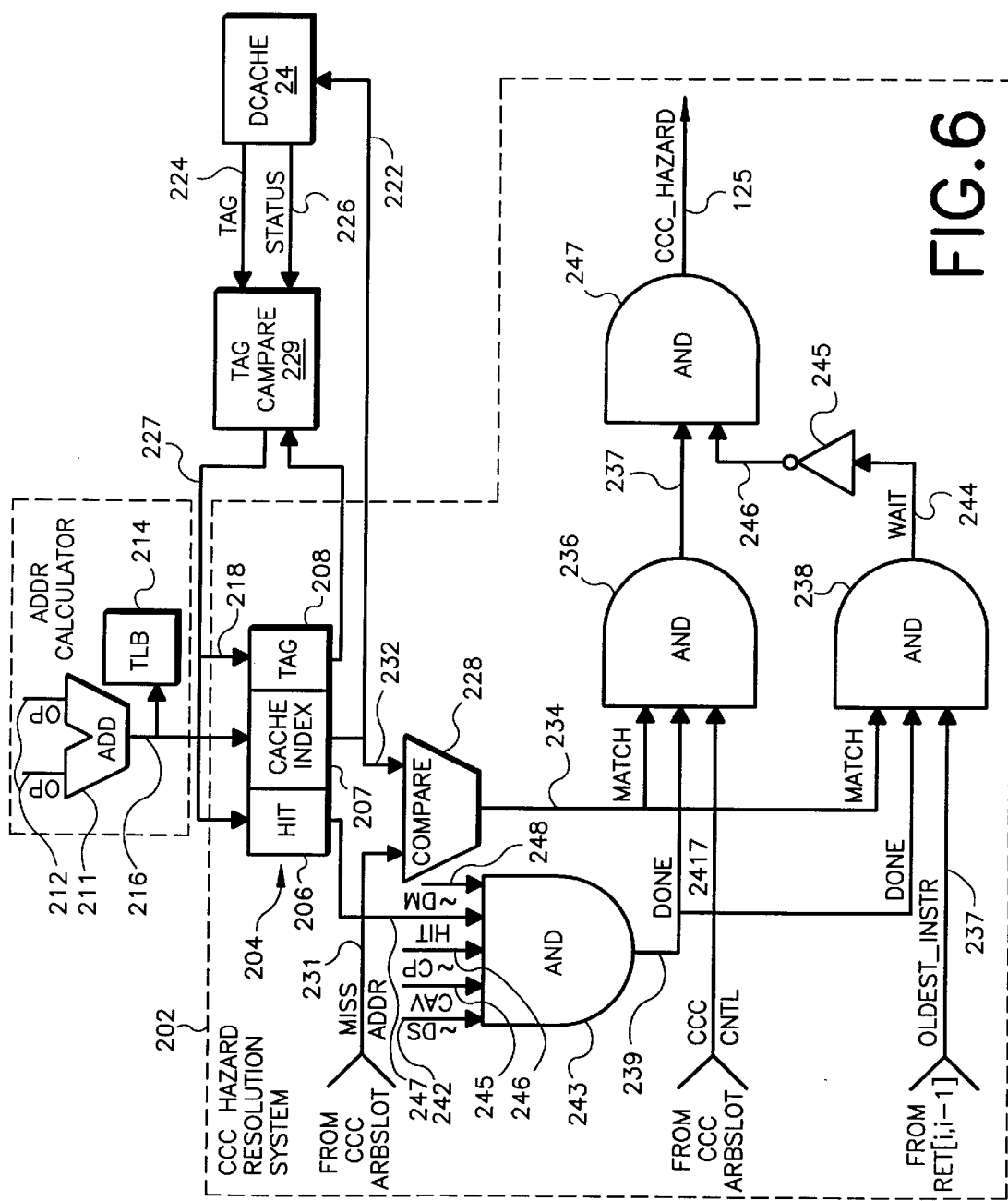
FIG. 6 is a block diagram showing a possible implementation of a cache coherency check (CCC) hazard resolution system for generating a signal CCC_HAZARD (and ultimately a panic trap) of FIG. 4.

With reference to FIG. 6, the CCC hazard resolution system 202 includes a register 204 having a hit (HIT) indicator 206, a cache index 207, and a tag 208. The cache index 207 and the tag 208 are received from the address calculator 58. The address calculator 58 includes an adder 211 for receiving and operating upon operands (OP) 212 from the rename registers 44a, 44b and/or the general registers 46 (FIG. 2). The adder 211 generates a virtual address, which is passed to the ARBSLOT 48 and to a translation lookaside buffer (TLB) 214, as indicated by reference arrow 216. The TLB 214 generates a real address tag based upon the virtual address 216 and passes it to the register 204, as indicated by reference arrow 218.

The cache index 207 in the register 204 is utilized to make accesses to the DCACHE 24, as indicated by reference arrow 222. The DCACHE 24, upon receiving a cache index 222, uses the incoming cache index to select and output a tag 224, a status indicator 226, and data. The tag 224 and the status indicator 226 are passed to a tag compare mechanism 229 for analysis to determine if there is a hit or a miss. The data is transferred to the MQUEUE rename registers 44b. The tag compare mechanism 229 also receives the tag 208 from the ARBSLOT register 204 so that the tag compare mechanism 229 can compare the tag 208 to the tag 224 from the DCACHE 24. If the comparison yields a match, then the tag compare mechanism 229 asserts a hit in the register 204 via the HIT indicator 206, as indicated by reference arrow 227.

The CCC hazard resolution system 202 further includes a cache index compare mechanism 228 configured to receive an address MISS_ADDR 231 (having a cache index) from the remote CCC ARBSLOT 48 and the cache index 207 from the local ARBSLOT register 204, as indicated by reference arrow 232. Based upon the comparison of the cache indices, the compare mechanism 228 generates a match signal (MATCH) 234 indicative of whether the instruction in the local ARBSLOT 48 has used the CCC data line. The signal MATCH 234 is forwarded to an AND logic gate 236, which has the ability to assert the CCC hazard signal 125, and to an AND logic gate 238, which has the ability to deassert the CCC hazard signal 125.

The AND logic gate 236 receives the signal MATCH 234, a signal DONE 239 that indicates if the local ARBSLOT 48 had a cache hit and has already received data, and a CCC control signal (CCC_CNTL) 241 from the CCC ARBSLOT 48 that indicates that the CCC ARBSLOT 48 has broadcast its address MISS_ADDR 231 for comparison. Based upon the states of the foregoing signals, the AND logic gate 236 generates a signal 237 and passes it to an AND logic gate 247, which generates the CCC hazard signal 125.

The signal DONE 239 is generated by an AND logic gate 243. To generate this signal DONE 239, the AND logic gate 243 receives the following: (a) a not dependent-on-store signal (~DS; see FIG. 7) 242 to indicate when the ARBSLOT 48 has a load instruction that depends upon a store instruction in another ARBSLOT 48; (b) a cache access valid signal (CAV) 245 to indicate when there is a valid address in the ARBSLOT 48; (c) a not cache pending signal (~CP; see FIG. 7) 246' to indicate when the DCACHE 24 has already been accessed by the instruction in the ARBSLOT 48; (d) a hit signal (HIT) 247 to indicate when either a hit or miss has occurred in the DCACHE 24; and (e) a not dependent-on-miss signal (~DM) 248' to indicate when the instruction in the local ARBSLOT 48 is not dependent upon currently outstanding miss data that is absent from the DCACHE 24.

The AND logic gate 238 receives the signal MATCH 234 from the cache index compare mechanism 228, the signal DONE 239 from the AND logic gate 243, and an oldest instruction pointer OLDEST_INSTR 237. The pointer OLDEST_INSTR 237 will indicate when the local ARBSLOT 48 has the oldest instruction and is about ready to retire the instruction. In the preferred embodiment, the signal OLDEST_INSTR 237 is generated by considering the retire pointers RET associated with the present ARBSLOT 48 and the previous ARBSLOT 48. If the retire pointer corresponding with the present ARBSLOT 48 is asserted and that of the previous ARBSLOT 48 is deasserted, then the present ARBSLOT 48 is the oldest and the signal OLDEST_INSTR 237 is asserted. However, if the retire pointer corresponding with the present ARBSLOT 48 is asserted and that of the previous ARBSLOT 48 is also asserted, then the present ARBSLOT 48 is not oldest and the signal OLDEST_INSTR 237 is deasserted.

When the instruction in the local ARBSLOT 48 is about ready to be retired by the retire mechanism 52 (FIG. 3), then the AND logic gate 238 will generate a wait signal (WAIT) 244, which is inverted by inverter 245 and sent to the AND logic gate 247, which deasserts the CCC hazard signal 125. Thus, if an ARBSLOT 48 is about ready to launch its instruction to the retire mechanism 52 (FIG. 3), the CCC hazard resolution system 202 will prevent a panic trap and allow the ARBSLOT 48 to complete. This feature prevents unnecessary and unwanted panic traps and optimizes performance.

Store-To-Load (ST/LD) Hazard Resolution System

Each ARBSLOT 48 contains and utilizes a store-to-load (ST/LD) hazard resolution system 250 for generating a panic trap in the event that an executed load instruction utilizes data that was dependent upon a store instruction that has not yet been executed. When a load instruction has used data that is dependent upon a nonexecuted store instruction, then the data is invalid, and accordingly, the results of the load instruction are invalid and should be discarded, and the load instruction should be reexecuted.

Figure 7:
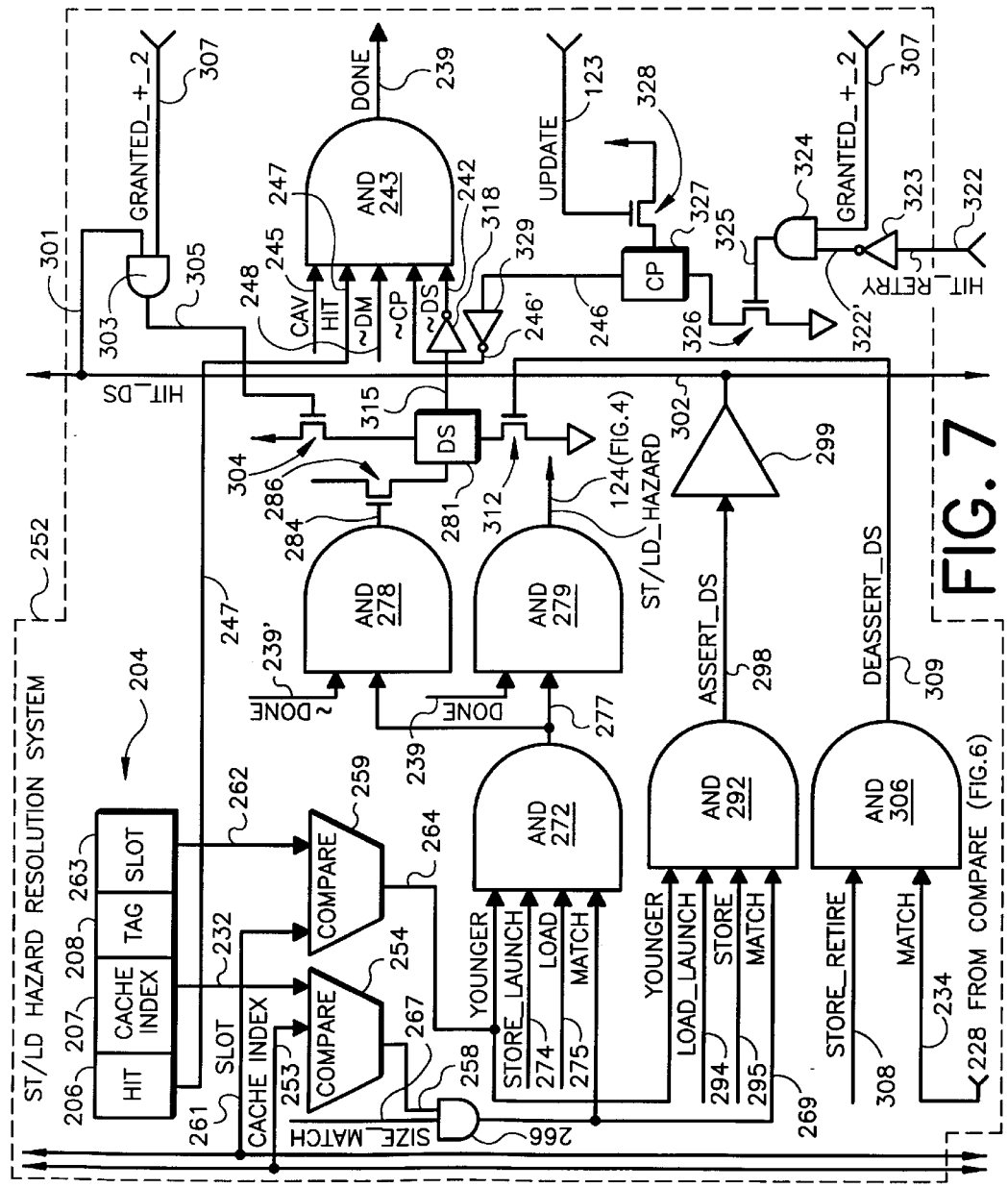
FIG. 7 is a block diagram showing a possible implementation of a store-to-load (ST/LD) hazard resolution system of the present invention for generating a signal ST/LD_HAZARD (and ultimately a panic trap) of FIG. 4 when a conflict involving a store-to-load dependency is detected.

Referring to FIG. 7, the ST/LD hazard resolution system 250 has a cache index compare mechanism 228 for comparing a remote cache index 253 from a remote ARBSLOT 48 with a local cache index 207 in the local register 204 in order to derive the compare signal 258 that is indicative of whether there is a match of the cache indices. When there is a match, then their respective instructions could potentially be directed to operations involving the same data. As will be described later, if their cache indices match, then a further check is performed regarding their relative data sizes in order to conclusively determine if the instructions involve the same data.

A slot compare mechanism 259 receives a remote slot number SLOT 261 from the remote ARBSLOT 48 and compares it with the local slot number SLOT 263 in the local register 204 in order to derive a signal YOUNGER 264 that is indicative of which of the two ARBSLOTs 48 is the younger instruction of the two. Instructions are placed in the ARBSLOTs 48 in sequence and, therefore, the slot numbers directly imply which of the ARBSLOTs 48 contain the younger instruction.

An AND logic gate 266 receives the compare signal 258 from the cache index compare mechanism 254 and a signal SIZE_MATCH 267 that is indicative of whether the data sizes corresponding with the instructions match in order to derive a signal MATCH 269. The data sizes in the preferred embodiment include a byte (8 bits), half word (hw; 16 bits), word (32 bits), and double word (dw; 64 bits). It is not necessary that the data sizes be identical, only that they overlap, in which case they are deemed to match. The signal SIZE_MATCH 267 is derived in accordance with a size match determination mechanism 326 that will be described in further detail with reference to FIG. 8 hereinafter. When the signal MATCH 269 is asserted, then there is a conclusion that the cache indices 207, 255 do match and that their corresponding data sizes match.

An AND logic gate 272 receives the signal YOUNGER 264, a signal STORE_LAUNCH 274 that indicates whether a store instruction is being launched by the remote ARBSLOT 48 to the DCACHE 24, a signal LOAD 275 that indicates whether the instruction in the local ARBSLOT 48 is a load instruction, and the signal MATCH 269 from the AND logic gate 266 that indicates whether there is a match between the cache indices and their data sizes. Based upon the foregoing signals, the AND logic gate 272 generates a signal 277 that is passed to AND logic gates 278, 279. The signal 277 can potentially cause a dependent-on-store (DS) indicator 281, such as a latch or other suitable logic mechanism, to assert a signal DS 315, or alternatively, cause the ST/LD hazard signal 124 (FIG. 4) to be asserted, depending upon whether or not the ARBSLOT 48 is done (has already executed and received a data address). Generally, the AND logic gate 272 becomes operative in an ARBSLOT 48 that has a load instruction when another ARBSLOT 48 has a store instruction that is starting to launch an address to the DCACHE 24.

The AND logic gate 278 receives the signal 277 from the AND logic gate 272 along with a not done signal ~DONE 282 in order to derive an actuator signal 284 for a transistor 286 that can assert the signal DS 315 with the DS indicator 281.

The AND logic gate 279 receives the signal 277 from the AND logic gate 272 along with a done signal DONE 288 in order to derive the signal ST/LD_HAZARD 124 (FIG. 4), which will ultimately cause a panic trap.

An AND logic gate 292 receives the signal YOUNGER 264 from the slot compare mechanism 259 that indicates whether the instruction in the local ARBSLOT 48 is older than the instruction in the remote ARBSLOT 48, or vice versa, a signal LOAD_LAUNCH 294 that indicates whether the instruction that is being launched by the remote ARBSLOT 48 is a load instruction, a signal STORE 295 that indicates whether the local ARBSLOT 48 contains a store instruction, and the match signal 269 from the AND logic gate 266 that indicates whether the cache indices 207, 255 as well as corresponding data sizes match. Based upon the foregoing signals, the AND logic gate 292 generates a signal ASSERT_DS which can ultimately assert the signal DS 315 via the DS indicator 281 in the same remote ARBSLOT 48 that triggered the match. The signal ASSERT_DS 298 is sent to a driver 299 that broadcasts a signal HIT_DS 302 to the other remote ARBSLOTS 48. The signal HIT_DS 302 actuates a transistor 304 for asserting the signal DS 315 in the DS indicator 281 when the signal GRANTED_+_2 denoted by numeral 307 is true, based upon AND logic gate 303 and actuation signal 305. The signal GRANTED_+_2 is asserted 2 cycles after access to the DCACHE 24 has been granted to the ARBSLOT 48 at issue. Hence, the AND logic gate 292 handles the scenario when a load instruction is launching to the DCACHE 24 and the local ARBSLOT 48 contains a store instruction that relates to data in which the load instruction is dependent upon. In this case, there is no need for a panic trap in that the load instruction is launching and has not received data yet (i.e., it is not done).

An AND logic gate 306 receives a signal STORE_RETIRE 308 from a remote ARBSLOT 48 that indicates when a store instruction is being retired in the remote ARBSLOT 48 and the signal MATCH 234 (FIG. 6; from the cache index compare mechanism 228 that indicates whether the cache index of the address MISS_ADDR matches the local cache index). Based upon the foregoing signals, the AND logic gate 306 generates a signal DEASSERT_DS 309, which ultimately deasserts the signal DS 315 maintained by the DS indicator 281. As shown in FIG. 7, the signal DEASSERT_DS 309 can actuate a transistor 312 that deasserts the signal DS 315 produced by the DS indicator 281.

Assertion of the signal DS 315 by the DS indicator 281 affects generation of the signal DONE 239, which indicates when the ARBSLOT 48 has executed its instruction and has received a data address corresponding to the results. In this regard, the AND logic gate 243 (FIG. 6) generates the signal DONE 239 from the following: the signal ~DS 242, which is generated by the inversion of the signal DS 315 with inverter 318, the signal CAV 245, the signal ~CP 246', the signal ~DM 248', and the signal HIT 247 from the HIT indicator 206. The signal DS 315, when asserted, prevents a dependent load from requesting access to the DCACHE 24.

The ARBSLOT 48 further receives a signal HIT_RETRY 322 from the retire mechanism 52 when a store instruction has been not progressed smoothly through the pipe of the retire mechanism 52 so as to cause the ARBSLOT 48 to access the DCACHE 24 once again for data. In this regard, the signal HIT_RETRY 322 is passed through an inverter 323 and into an AND logic gate 324. The AND logic gate 324 also receives the signal GRANT_+_2 denoted by numeral 307. When the HIT_RETRY 322 is received two cycles after DCACHE access has been granted, then the AND logic gate 324 asserts signal 325. The signal 325 actuates a transistor 326, which in turn actuates a CP indicator 327. The CP indicator 327 is a latch or other suitable logic device that is configured to deassert or assert the signal CP 246 to indicate whether or not, respectively, the ARBSLOT 48 has accessed the DCACHE 24. The CP indicator 327 can be set to assert the signal CP 246 by a transistor 328 that is connected to a logical high voltage and actuated by the signal UPDATE 123. Further, the signal CP 246 is sent to an inverter 329 to generate the signal ~CP 246', which is communicated to the AND logic gate 243 for generating the signal DONE 239. Thus, when the signal HIT_RETRY 322 is asserted, the signal ~CP 246' remains deasserted to the AND logic gate 243 to thereby deassert the signal DONE 239.

Figure 8:
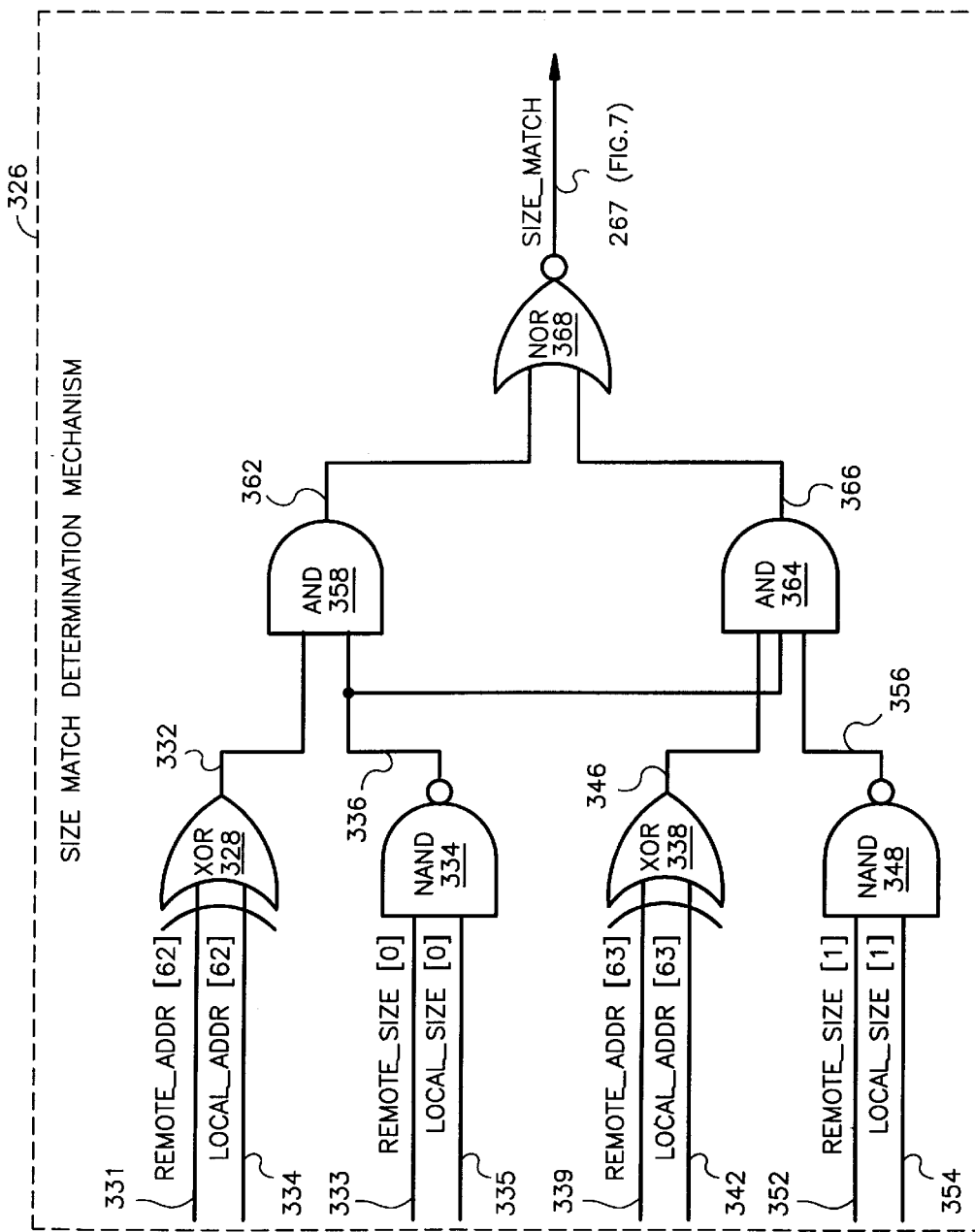
FIG. 8 is a block diagram showing a possible implementation of a size match determination mechanism for generating a signal SIZE_MATCH of FIG. 7.

FIG. 8 illustrates size match determination logic 326 in each ARBSLOT 48 for generating the signal SIZE_MATCH 267 (FIG. 7). In general, the logic 326 of FIG. 8 determines whether or not a load instruction can depend upon a store instruction based upon their respective data sizes. The data associated with each instruction can be any of the following sizes: a byte (8 bits); a half word (16 bits); a word (32 bits); and a double word (64 bits). It is possible for load data to depend upon store data when the data is of different sizes so long as there is an overlap of data addresses. For example, a load byte may depend upon a store word if the load byte overlaps with the store word. As another example, a load half word may depend upon a store byte if the store byte is encompassed within the load half word.

The address associated with each of the ARBSLOTS 48 includes signals SIZE (preferably, two bits) that are indicative of the size. The encoding of SIZE is as follows: "00" means a byte; "01" means a half word; "10" means a word; and "11" means a double word.

With reference to FIG. 8, the SIZE_MATCH mechanism 326 includes a XOR logic gate 328 for receiving a signal REMOTE_ADDR[62], denoted by reference numeral 331 and corresponding with the launching instruction, and a signal LOCAL_ADDR[62] 256a, denoted by reference numeral 334 and corresponding with the local instruction. Based upon the foregoing signals, the XOR logic gate 328 generates a signal 332 indicating whether or not there is a match of these address bits.

A NAND logic gate 334 receives a signal REMOTE_SIZE[0], denoted by reference numeral 333 and corresponding with the remote launching instruction, and a signal LOCAL_SIZE[0], denoted by reference numeral 335 and corresponding with the local instruction, in order to generate a signal 336 that indicates, when asserted, that one or both addresses are greater than a half word in size. Therefore, a match of address bits [63,62] of the instructions are not necessary for operations to overlap.

A XOR logic gate 338 receives a signal REMOTE_ADDR[63], denoted by reference numeral 339 and corresponding with the remote launching instruction, and a signal LOCAL_ADDR[63], denoted by reference numeral 342 and corresponding with the local instruction, in order to generate a signal 346 that indicates whether or not there is a match of these address bits.

A NAND logic gate 348 receives a signal REMOTE_SIZE[1], denoted by reference numeral 352 and corresponding with the remote launching instruction, and a signal LOCAL_SIZE[1], denoted by reference numeral 354 and corresponding with the local instruction, in order to generate a signal 356 that indicates, when asserted, that one or both addresses are greater than a byte in size, so a match of address bit [63] is not necessary for the operations to overlap.

An AND logic gate 358 receives the signals 332, 336 and generates a signal 362 therefrom, which indicates, when asserted, that address bits [62] do not match.

An AND logic gate 364 receives the signals 346, 356 and generates a signal 366 therefrom, which is indicate whether or not the address bits [63] match.

A NOR logic gate 368 receives the signals 362, 366 and generates the signal SIZE_MATCH 267, which is conclusive as to whether the data sizes match for an appropriate comparison.

The overall operation of the ST/LD hazard resolution system 250 (FIG. 7) as well as the size match determination mechanism 326 (FIG. 8) therein is described as follows.

When a store instruction launches and matches a load instruction within the local ARBSLOT 48, a determination is made as to whether the load instruction is younger than the store instruction. If the load instruction is not younger than the store instruction, then no action is taken. If the load instruction is younger than the store instruction, then the signal ST/LD_HAZARD 124 is asserted, if the load instruction is done, or alternatively, the DS indicator is asserted if the load instruction is not done.

When a load instruction launches and matches a store instruction in another ARBSLOT 48, the ARBSLOT 48 having the store instruction causes assertion of the signal DS 315 in the ARBSLOT 48 having the load instruction.

The signal DS 315, which is asserted and deasserted by the DS indicator 281, is cleared by a load instruction in an ARBSLOT 48 when a store instruction that matches in another ARBSLOT 48 is retiring. When the DS indicator is deasserted at an ARBSLOT 48, the ARBSLOT 48 is permitted to access the DCACHE 24.

Arbitration System

Figure 9:
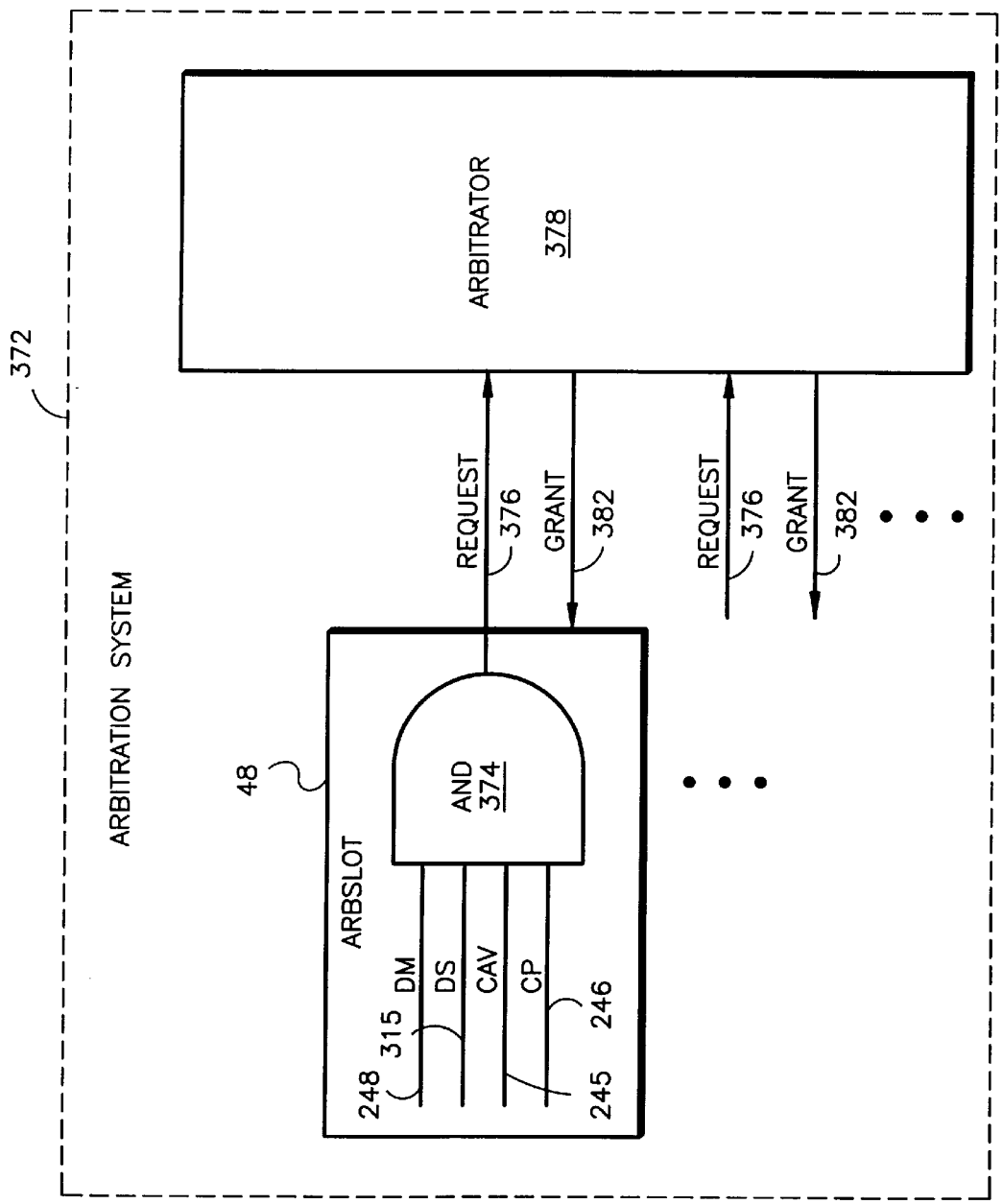
FIG. 9 is a block diagram showing a possible implementation of an arbitration system that is employed within the MQUEUE of FIGS. 2 and 3.

In the preferred embodiment, an arbitration system 372 as shown in FIG. 9 is implemented to arbitrate requests from the ARBSLOTs 48 to access the DCACHE 24.

In this regard, each ARBSLOT 48 includes an AND logic gate 374 that receives the signal DM 248 to indicate whether or not the ARBSLOT 48 is dependent upon miss data, the signal DS 315 to indicate whether or not the ARBSLOT 48 is dependent upon a store instruction, the signal CAV 245 to indicate whether or not there is a valid address in the ARBSLOT 48, and the cache pending signal CP 246 to indicate whether or not the DCACHE 24 has already been accessed by the instruction in the ARBSLOT 48. When all of the aforementioned signals are true, then the AND logic gate 374 asserts a signal REQUEST 376 to request access to the DCACHE 24.

An arbitrator 378 receives the signal REQUEST 376 and prioritizes it relative to other REQUESTs 376 from other ARBSLOTs 48. The arbitrator 378 can employ any suitable logic for arbitrating, prioritizing, and granting requests. Eventually, each ARBSLOT 48 that has issued the signal REQUEST 376 will be granted access to the DCACHE 24 by the arbitrator 378 via assertion of a signal GRANT 382 from the arbitrator 378. Issuance of the signal GRANT 382 causes that ARBSLOT 48 to dump its cache index 207 and slot number 263 to the respective buses 253, 261 as well as the relevant control signals, as previously discussed.

Worth noting is that when a load instruction is dependent upon a store instruction, the ARBSLOT 48 containing the load instruction will refrain from requesting access to the arbitrator 378, based upon an asserted signal DS in the ARBSLOT 48.

Many variations and modifications may be made to the preferred embodiment of the invention as described previously. As an example, instructions in the preferred embodiment were reordered in queues 38a, 38b; however, one with skill in the art would realize that instructions can be reordered in any suitable reordering mechanism, including a reservation station. All such modifications and variations are intended to be included herein within the scope of the present invention, as is defined by the following claims. Finally, in the claims hereafter, the structures, materials, acts, and equivalents of all means-plus-function elements and all step-plus-function elements are intended to include any and all structures, materials, or acts for performing the specified functions.

Wherefore, the following is claimed:

1. A method for resolving conflicts produced from store-to-load dependencies and out of order execution of instructions in a processor, the method comprising the steps of:

collecting instructions in a reordering mechanism;

executing said instructions out of order;

retiring instructions after execution by removing said retired instructions from said reordering mechanism;

determining that a load instruction depends upon data that is to be provided by a store instruction, while said load and store instructions reside in said reordering mechanism;

if said load instruction is unexecuted, then preventing execution of said load instruction until said store instruction is executed;

if said load instruction is executed, then associating a panic trap indicator with said load instruction; and when retiring said load instruction, recognizing said panic trap indicator, purging any remaining instructions in said reordering mechanism, reaccumulating another set of instructions beginning with said load instruction, and executing said another set of instructions out of order.

2. A system for resolving conflicts produced from store-to-load dependencies and out of order execution of instructions in a processor, the system comprising:

(1) a fetch mechanism associated with said processor, said fetch mechanism configured to fetch instructions;

(2) a reordering mechanism associated with said processor, said reordering mechanism configured to receive said instructions from said fetch mechanism and to execute said instructions out of order;

(3) hazard resolution logic associated with said reordering mechanism, said hazard resolution logic configured to determine when a load instruction depends upon data that is to be provided by a store instruction, said hazard resolution logic configured to prevent execution of said load instruction until said store instruction is executed if said load instruction is unexecuted, said hazard resolution logic configured to recommence execution beginning with said load instruction if said load instruction is already executed; and (4) wherein said reordering mechanism comprises a plurality of address reorder buffer slots configured to receive and execute respective instructions out of order, each said slot comprising:

(a) a cache index compare mechanism configured to compare a remote cache index of a remote instruction in a remote slot and a local cache index of its local instruction to determine when said remote and local instructions are directed to a same data line;

(b) a slot number compare mechanism configured to compare a remote slot number of said remote slot and a local slot number corresponding with itself to determine a younger slot; and (c) store-to-load (STILD) logic configured to:
  (1) actuate a local dependent-on-store (DS) indicator to assert a local DS signal when (i) said instructions are directed to said same data line, (ii) said local instruction is younger than said remote instruction, (iii) said local instruction is a load instruction and is unexecuted, and (iv) said remote instruction is a store instruction;
  (2) associate said panic trap indicator with said load instruction when (i) said local DS signal is asserted and (ii) said local load instruction is executed; and
  (3) associate said panic trap indicator with said load instruction when (i) said instructions are directed to said same data line, (ii) said local instruction is younger than said remote instruction, (iii) said local instruction is said load instruction and is executed, and (iv) said remote instruction is said store instruction.

3. The system of claim 2, further comprising DS deassertion logic configured to deassert said DS signal when said store instruction is executed and removed from said reordering mechanism.

4. A system for resolving conflicts produced from store-to-load dependencies and out of order execution of instructions in a processor, the system comprising:
  (1) a fetch mechanism associated with said processor, said fetch mechanism configured to fetch instructions;
  (2) a reordering mechanism associated with said processor, said reordering mechanism configured to receive said instructions from said fetch mechanism and to execute said instructions out of order;
  (3) hazard resolution logic associated with said reordering mechanism, said hazard resolution logic configured to determine when a load instruction depends upon data that is to be provided by a store instruction, said hazard resolution logic configured to prevent execution of said load instruction until said store instruction is executed if said load instruction is unexecuted, said hazard resolution logic configured to recommence execution beginning with said load instruction if said load instruction is already executed;
  (4) wherein said reordering mechanism comprises a plurality of address reorder buffer slots configured to receive and execute respective instructions out of order, each said slot comprising:
    (a) a cache index compare mechanism configured to compare a remote cache index of a remote instruction in a remote slot and a local cache index of its local instruction to determine when said remote and local instructions are directed to a same data line;
    (b) a slot number compare mechanism configured to compare a remote slot number of said remote slot and a local slot number corresponding with itself to determine a younger slot; and
    (c) remote DS logic configured to actuate a remote DS indicator associated with said remote slot to assert a remote DS signal when (i) said instructions are directed to said same data line, (ii) said local instruction is younger than said remote instruction, (iii) said local instruction is said store instruction, and (iv) said remote instruction is said load instruction;
  (5) wherein said hazard resolution logic is configured to associate a panic trap indicator with said executed load instruction; and
  (6) a trap vector generator associated with said reordering mechanism and said fetch mechanism, said trap vector generator configured to purge said reordering mechanism and cause said fetch mechanism to recommence fetching, beginning with said load instruction based upon said panic trap indicator.

5. The system of claim 4, further comprising DS deassertion logic configured to deassert said DS signal when said store instruction is executed and removed from said reordering mechanism.

6. A method for resolving conflicts produced from store-to-load dependencies and out of order execution of instructions in a processor, the method comprising the steps of:
  (1) accumulating a set of instructions;
  (2) executing said instructions out of order;
  (3) determining that a load instruction depends upon data that is to be provided by a store instruction;
  (4) if said load instruction is unexecuted, then preventing execution of said load instruction until said store instruction is executed;
  (5) if said load instruction is executed, then recommencing execution beginning with said load instruction;
  (6) placing said instructions in respective slots and executing said instructions while residing in said slots; and
  (7) at each said slot:
    (a) comparing a remote cache index of a remote instruction in a remote slot and a local cache index of its local instruction to determine when said remote and local instructions are directed to a same data line;
    (b) comparing a remote slot number of said remote slot and a local slot number corresponding with itself to determine a younger slot;
    (c) actuating a local dependent-on-store (DS) indicator to assert a local DS signal when (i) said instructions are directed to said same data line, (ii) said local instruction is younger than said remote instruction, (iii) said local instruction is a load instruction and is unexecuted, and (iv) said remote instruction is a store instruction;
    (d) associating a panic trap indicator with said load instruction when (i) said local DS signal is asserted and (ii) said local load instruction is executed; and
    (e) associating said panic trap indicator with said load instruction when (i) said instructions are directed to said same data line, (ii) said local instruction is younger than said remote instruction, (iii) said local instruction is said load instruction and is executed, and (iv) said remote instruction is said store instruction.

7. The method of claim 6, further comprising the step of deasserting said DS signal when said store instruction is executed and removed from said reordering mechanism.

8. A method for resolving conflicts produced from store-to-load dependencies and out of order execution of instructions in a processor, the method comprising the steps of:
  (1) accumulating a set of instructions;
  (2) executing said instructions out of order;
  (3) determining that a load instruction depends upon data that is to be provided by a store instruction;
  (4) if said load instruction is unexecuted, then preventing execution of said load instruction until said store instruction is executed;
  (5) if said load instruction is executed, then recommencing execution beginning with said load instruction;
  (6) placing said instructions in respective slots and executing said instructions while residing therein; and (7) in each said slot:
  (a) comparing a remote cache index of a remote instruction in a remote slot and a local cache index of its local instruction to determine when said remote and local instructions are directed to a same data line;
  (b) comparing a remote slot number of said remote slot and a local slot; number corresponding with itself to determine a younger slot; and
  (c) actuating a remote DS indicator associated with said remote slot to assert a remote DS signal when (i) said instructions are directed to said same data line, (ii) said local instruction is younger than said remote instruction, (iii) said local instruction is said store instruction, and (iv) said remote instruction is said load instruction.

9. The method of claim 8, further comprising the step of deasserting said DS signal when said store instruction is executed and removed from said reordering mechanism.

10. A system for resolving conflicts produced from store-to-load dependencies and out of order execution of instructions in a processor, the system comprising:
  a fetch mechanism associated with said processor, said fetch mechanism configured to fetch instructions;
  a reordering mechanism associated with said processor, said reordering mechanism configured to receive said instructions from said fetch mechanism and to execute said instructions out of order; and
  hazard resolution logic associated with said reordering mechanism, said hazard resolution logic configured to determine when a load instruction depends upon data that is to be provided by a store instruction, said hazard resolution logic configured to prevent execution of said load instruction until said store instruction is executed if said load instruction is unexecuted, said hazard resolution logic configured to recommence execution beginning with said load instruction if said load instruction is already executed, said hazard resolution logic configured to associate a panic trap indicator with said executed load instruction; and
  a trap vector generator associated with said reordering mechanism and said fetch mechanism, said trap vector generator configured to purge said reordering mechanism and cause said fetch mechanism to recommence fetching, beginning with said load instruction based upon said panic trap indicator.

11. The system of claim 10, wherein said reordering mechanism is a queue.

12. The system of claim 10, wherein said instructions are directed to memory accesses.

13. The system of claim 10, wherein said panic trap indicator is a nonarchitectural signal that is invisible to software driving said processor.

14. The system of claim 10, wherein said reordering mechanism comprises a plurality of address reorder buffer slots configured to receive and execute respective instructions out of order, each said slot comprising:
  (a) a cache index compare mechanism configured to compare a remote cache index of a remote instruction in a remote slot and a local cache index of its local instruction to determine when said remote and local instructions are directed to a same data line;
  (b) a slot number compare mechanism configured to compare a remote slot number of said remote slot and a local slot number corresponding with itself to determine a younger slot; and
  (c) store-to-load (ST/LD) logic configured to:
    (1) actuate a local dependent-on-store (DS) indicator to assert a local DS signal when (i) said instructions are directed to said same data line, (ii) said local instruction is younger than said remote instruction, (iii) said local instruction is a load instruction and is unexecuted, and (iv) said remote instruction is a store instruction;
    (2) associate said panic trap indicator with said load instruction when (i) said local DS signal is asserted and (ii) said local load instruction is executed; and
    (3) associate said panic trap indicator with said load instruction when (i) said instructions are directed to said same data line, (ii) said local instruction is younger than said remote instruction, (iii) said local instruction is said load instruction and is executed, and (iv) said remote instruction is said store instruction.

15. The system of claim 14, further comprising DS deassertion logic configured to deassert said DS signal when said store instruction is executed and removed from said reordering mechanism.

16. The system of claim 10, wherein said reordering mechanism comprises a plurality of address reorder buffer slots configured to receive and execute respective instructions out of order, each said slot comprising:
  (a) a cache index compare mechanism configured to compare a remote cache index of a remote instruction in a remote slot and a local cache index of its local instruction to determine when said remote and local instructions are directed to a same data line;
  (b) a slot number compare mechanism configured to compare a remote slot number of said remote slot and a local slot number corresponding with itself to determine a younger slot; and
  (c) remote DS logic configured to actuate a remote DS indicator associated with said remote slot to assert a remote DS signal when (i) said instructions are directed to said same data line, (ii) said local instruction is younger than said remote instruction, (iii) said local instruction is said store instruction, and (iv) said remote instruction is said load instruction.

17. The system of claim 16, further comprising DS deassertion logic configured to deassert said DS signal when said store instruction is executed and removed from said reordering mechanism.

18. A method for resolving conflicts produced from store-to-load dependencies and out of order execution of instructions in a processor, the method comprising the steps of:
  accumulating a set of instructions;
  executing said instructions out of order;
  determining that a load instruction depends upon data that is to be provided by a store instruction;
  if said load instruction is unexecuted, then preventing execution of said load instruction until said store instruction is executed; and
  if said load instruction is executed, then producing a panic trap indicator, associating said panic trap indicator with said executed load instruction, and recommencing execution beginning with said load instruction based upon said panic trap indicator.

19. The method of claim 18, further comprising the step of maintaining said set in a reordering mechanism.

20. The method of claim 18, further comprising the step of placing said instructions in a queue that contains only instructions directed to memory accesses and executing said instructions while residing in said queue.

21. The method of claim 18, further comprising the steps of:
(a) placing said instructions in respective slots and executing said instructions while residing in said slots;
(b) at each said slot:
(1) comparing a remote cache index of a remote instruction in a remote slot and a local cache index of its local instruction to determine when said remote and local instructions are directed to a same data line;
(2) comparing a remote slot number of said remote slot and a local slot number corresponding with itself to determine a younger slot; and
(3) actuating a local dependent-on-store (DS) indicator to assert a local DS signal when (i) said instructions are directed to said same data line, (ii) said local instruction is younger than said remote instruction, (iii) said local instruction is a load instruction and is unexecuted, and (iv) said remote instruction is a store instruction;
(4) associating a panic trap indicator with said load instruction when (i) said local DS signal is asserted and (ii) said local load instruction is executed; and
(5) associating said panic trap indicator with said load instruction when (i) said instructions are directed to said same data line, (ii) said local instruction is younger than said remote instruction, (iii) said local instruction is said load instruction and is executed, and (iv) said remote instruction is said store instruction.

22. The method of claim 21, further comprising the step of deasserting said DS signal when said store instruction is executed and removed from said reordering mechanism.

23. The method of claim 18, further comprising the steps of:
(a) placing said instructions in respective slots and executing said instructions while residing therein; and
(b) in each said slot:
(1) comparing a remote cache index of a remote instruction in a remote slot and a local cache index of its local instruction to determine when said remote and local instructions are directed to a same data line;
(2) comparing a remote slot number of said remote slot and a local slot number corresponding with itself to determine a younger slot; and
(3) actuating a remote DS indicator associated with said remote slot to assert a remote DS signal when (i) said instructions are directed to said same data line, (ii) said local instruction is younger than said remote instruction, (iii) said local instruction is said store instruction, and (iv) said remote instruction is said load instruction.

24. The method of claim 23, further comprising the step of deasserting said DS signal when said store instruction is executed and removed from said reordering mechanism.

25. The method of claim 18, further comprising the step of producing said panic trap indicator with a nonarchitectural signal that is invisible to software driving said processor.

26. A processor, comprising:
a fetch mechanism configured to fetch instructions;
a reordering mechanism configured to receive said instructions from said fetch mechanism and to execute said instructions out of order; and
hazard resolution logic associated with said reordering mechanism, said hazard resolution logic configured to determine when a load instruction depends upon data that is to be provided by a store instruction, said hazard resolution logic configured to prevent execution of said load instruction until said store instruction is executed if said load instruction is unexecuted, said hazard resolution logic configured to recommence execution beginning with said load instruction if said load instruction is already executed, said hazard resolution logic configured to associate a panic trap indicator with said executed load instruction; and
a trap vector generator configured to purge said reordering mechanism and cause said fetch mechanism to recommence fetching, beginning with said load instruction based upon said panic trap indicator.

27. A processor, comprising:
first means for accumulating a set of instructions;
second means for executing said instructions out of order;
third means for determining that a load instruction depends upon data that is to be provided by a store instruction;
fourth means for, if said load instruction is unexecuted, preventing execution of said load instruction until said store instruction is executed; and
fifth means for, if said load instruction is executed, producing a panic trap indicator, associating said panic trap indicator with said executed load instruction, and recommencing execution beginning with said load instruction based upon said panic trap indicator.

* * * * *